United States Patent
Oh (10) Patent No.: US 9,493,206 B1
(45) Date of Patent: Nov. 15, 2016

(54) TRANSFORMABLE FOLDING ELECTRIC SCOOTER

(71) Applicant: Steve Oh, Los Angeles, CA (US)

(72) Inventor: Steve Oh, Los Angeles, CA (US)

( * ) Notice: Subject to any disclaimer, the term of this patent is extended or adjusted under 35 U.S.C. 154(b) by 0 days.

(21) Appl. No.: 14/698,769

(22) Filed: Apr. 28, 2015

(51) Int. Cl.
| | | |
|---|---|---|
| *B62K 15/00* | (2006.01) | |
| *B62K 5/027* | (2013.01) | |
| *B62K 21/16* | (2006.01) | |
| *B62K 5/007* | (2013.01) | |
| *B62L 1/02* | (2006.01) | |

(52) U.S. Cl.
CPC ............ *B62K 15/006* (2013.01); *B62K 5/007* (2013.01); *B62K 5/027* (2013.01); *B62K 15/008* (2013.01); *B62K 21/16* (2013.01); *B62L 1/02* (2013.01); *B62K 2202/00* (2013.01); *B62K 2204/00* (2013.01)

(58) Field of Classification Search
CPC .. B62K 15/008; B62K 15/006; B62K 15/00; B62K 2015/001; B62K 5/027; B62K 2202/00
USPC .................................................. 180/208, 211
See application file for complete search history.

(56) References Cited

U.S. PATENT DOCUMENTS

| | | | | |
|---|---|---|---|---|
| 3,282,365 A | * | 11/1966 | McReynolds .......... | B62D 61/08 180/208 |
| 3,388,761 A | * | 6/1968 | Arpin ..................... | B62D 61/08 180/208 |
| 3,580,348 A | * | 5/1971 | Di Blasi ................. | B60F 5/003 180/208 |
| 4,821,832 A | * | 4/1989 | Patmont ................. | B62K 3/002 180/208 |
| 7,967,095 B2 | * | 6/2011 | Kosco .................... | B62K 5/025 180/208 |
| 8,720,918 B2 | * | 5/2014 | Liao ....................... | B62K 3/002 280/287 |
| 9,073,594 B2 | * | 7/2015 | Sluijter .................. | B62K 11/10 |
| 9,139,228 B2 | * | 9/2015 | Chen ...................... | B62D 21/12 |
| 9,302,691 B2 | * | 4/2016 | Cheng .................... | B62B 3/02 |
| 2009/0308676 A1 | * | 12/2009 | Wang .................... | B62K 15/006 180/208 |
| 2010/0044137 A1 | * | 2/2010 | Atherton ................ | B62K 3/002 180/223 |
| 2010/0187034 A1 | * | 7/2010 | Wang .................... | B62K 15/008 180/208 |
| 2012/0256386 A1 | * | 10/2012 | Benarrouch .......... | B62K 15/008 280/87.05 |
| 2013/0153322 A1 | * | 6/2013 | Constin .................. | B62B 1/002 180/212 |
| 2013/0306392 A1 | * | 11/2013 | Schaap .................. | B62K 3/002 180/220 |
| 2015/0209205 A1 | * | 7/2015 | Ransenberg ......... | B62K 15/008 280/641 |

FOREIGN PATENT DOCUMENTS

GB        2477512 A  *  8/2011  ............ B62K 3/002

* cited by examiner

*Primary Examiner* — Keith Frisby
(74) *Attorney, Agent, or Firm* — John K. Park; Park Law Firm (57) ABSTRACT

A transformable folding electric scooter comprises a motor engine, a connecting frame, and a boarding plate. The connecting frame comprises a handle frame disposed upright and having a handle at a top portion thereof, a front frame extending forward from a lower portion of the handle frame and connected to the motor engine foldably at a first folding position provided on the motor engine, and a rear frame extending rearward from the lower portion of the handle frame. The boarding plate comprises a front plate portion connected to a lower portion of the rear frame fixedly, and a rear plate portion connected to the front plate portion foldably at a second folding position provided between the front plate portion and the rear plate portion of the connecting frame. The rear plate portion is folded upward with respect to the front plate portion at the second folding position.

17 Claims, 11 Drawing Sheets

TRANSFORMABLE FOLDING ELECTRIC SCOOTER

BACKGROUND OF THE INVENTION

The present invention relates to a transformable folding electric scooter.

Electric scooters are getting popular for good reasons. It is simple, compact, and multi-purposeful in many situations.

Still there are many issues to solve for further improvement in the community.

As for the size, the more compact, the better. And if it is foldable, there may be an infinite potentiality for smart folding.

In addition to the spatial flexibility, the scooter must be multi-purposeful in a creative sense, enabling the scooter used in many otherwise distinct fields of usage.

Accordingly, a need for a transformable folding electric scooter has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a transformable folding electric scooter.

A transformable folding electric scooter comprises a motor engine, a connecting frame, and a boarding plate.

The motor engine comprises a power wheel provided in an engine body, an electric motor installed in a hub portion of the power wheel and configured for rotating the power wheel, a rechargeable battery provided in the engine body, and a power control board provided on an external surface of the engine body.

The connecting frame comprises a handle frame disposed upright and having a handle at a top portion thereof, a front frame extending forward from a lower portion of the handle frame and connected to the motor engine foldably at a first folding position provided on the motor engine, and a rear frame extending rearward from the lower portion of the handle frame.

The boarding plate comprises a front plate portion connected to a lower portion of the rear frame fixedly, and a rear plate portion connected to the front plate portion foldably at a second folding position provided between the front plate portion and the rear plate portion of the boarding plate.

The transformable folding electric scooter further comprises a guide rail attached fixedly on a bottom surface extending along a central portion of the boarding plate.

The guide rail comprises a front rail portion fixedly attached on the bottom surface of the front plate portion and a rear rail portion fixedly attached on the bottom surface of the rear plate portion. The front rail portion and the rear rail portion are configured to be divided when the front and rear plate portions are folded.

The transformable folding electric scooter further comprises a wheel-hub portion provided in the guide rail so as to be moved along the guide rail and fixed at a first fixing position under the front plate portion and a second fixing position under the rear plate portion.

The transformable folding electric scooter further comprises a pair of rear wheels extending from the wheel-hub portion.

The motor engine is folded upward at the first folding position.

The rear plate portion is folded upward with respect to the front plate portion at the second folding position.

The motor engine may comprise a first detachable fastener and the front frame comprises a second detachable fastener, so that the first detachable fastener and the second detachable fastener engage each other detachably.

The handle frame may comprise a plurality of controllers connected to the power control board.

The handle frame may comprise a foldable joint for folding the handle frame by at least 90 degrees.

The handle frame may be configured to tilt sideways by about 15 degrees about a lower end portion thereof.

The motor engine may be detachable from the front frame at the first folding position.

The front plate portion and the rear plate portion may be configured to fold downward only at the second folding position.

The transformable folding electric scooter may further comprise a fastener handle for engaging one of two through-holes bored through the front plate portion and the rear plate portion and a fastening hole provided on the wheel-hub portion and fixing the assembly of the wheel-hub portion and the two rear wheels to the boarding plate.

The fastener handle may comprise a handle portion and a fastening portion.

The fastening portion may comprise male threads, and each of the two through-holes and the fastening hole comprises female threads.

The transformable folding electric scooter may further comprise one or two auxiliary wheels provided on a rear end portion of the rear plate portion and disposed tiltedly rearwards above a floor defined by the two rear wheels by a specific distance.

The front plate portion may have a length so as to minimize a folding length in a to-and-fro direction.

The power wheel and the hub portion may be configured to be deployed to one of two positions including a retracted position and a deployed position, wherein the retracted position is obtained by a spring installed between the hub portion and the rechargeable battery portion without an external force, and the deployed position is obtained by stretching the spring and locking with a locker.

The handle frame may comprise a first foldable joint and a second foldable joint.

The first foldable joint is disposed in a middle portion thereof for folding the middle portion of the handle frame by at least 90 degrees.

The second foldable joint is disposed above the first foldable joint for folding an upper portion of the handle frame by at least 60 degrees.

The handle frame may further comprise a telescoping retractable joint between the first and second foldable joints.

The transformable folding electric scooter may further comprise an L-shaped guiding protrusion provided on each end of the guide rail, and a guiding groove for receiving a corresponding L-shaped guiding protrusion.

The transformable folding electric scooter may further comprise two auxiliary axle supports provided on a rear portion of a lower surface of the boarding plate. Each of the two auxiliary axle supports engages the rear-wheel axle through a hole provided through the auxiliary axle supports, and each of the two auxiliary axle supports is configured to be fixed to the boarding plate with a mechanical fastener.

The transformable folding electric scooter may further comprise a front brake provided in the hub portion.

The transformable folding electric scooter may further comprise two rear brakes provided in the rear wheels.

The advantages of the present invention are: (1) the transformable folding electric scooter according to the invention can be transformed to and used as a scooter and shopping cart; and (2) the transformable folding electric scooter can be folded compactly and carried around conveniently.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Referring to the figures, the embodiments of the invention are described in detail.

Figure 1:
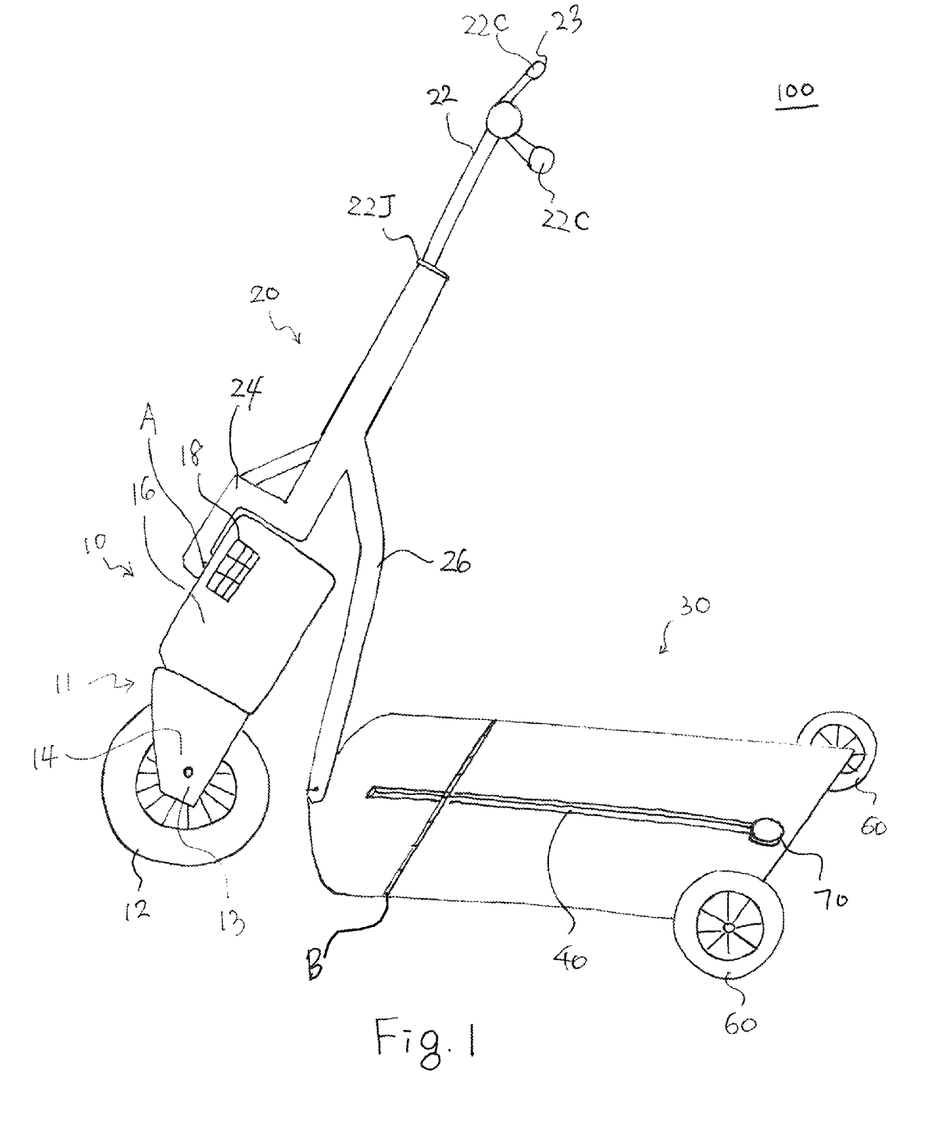
FIG. 1 is a perspective view showing a transformable folding electric scooter unfolded according to an embodiment of the invention.
Figure 2:
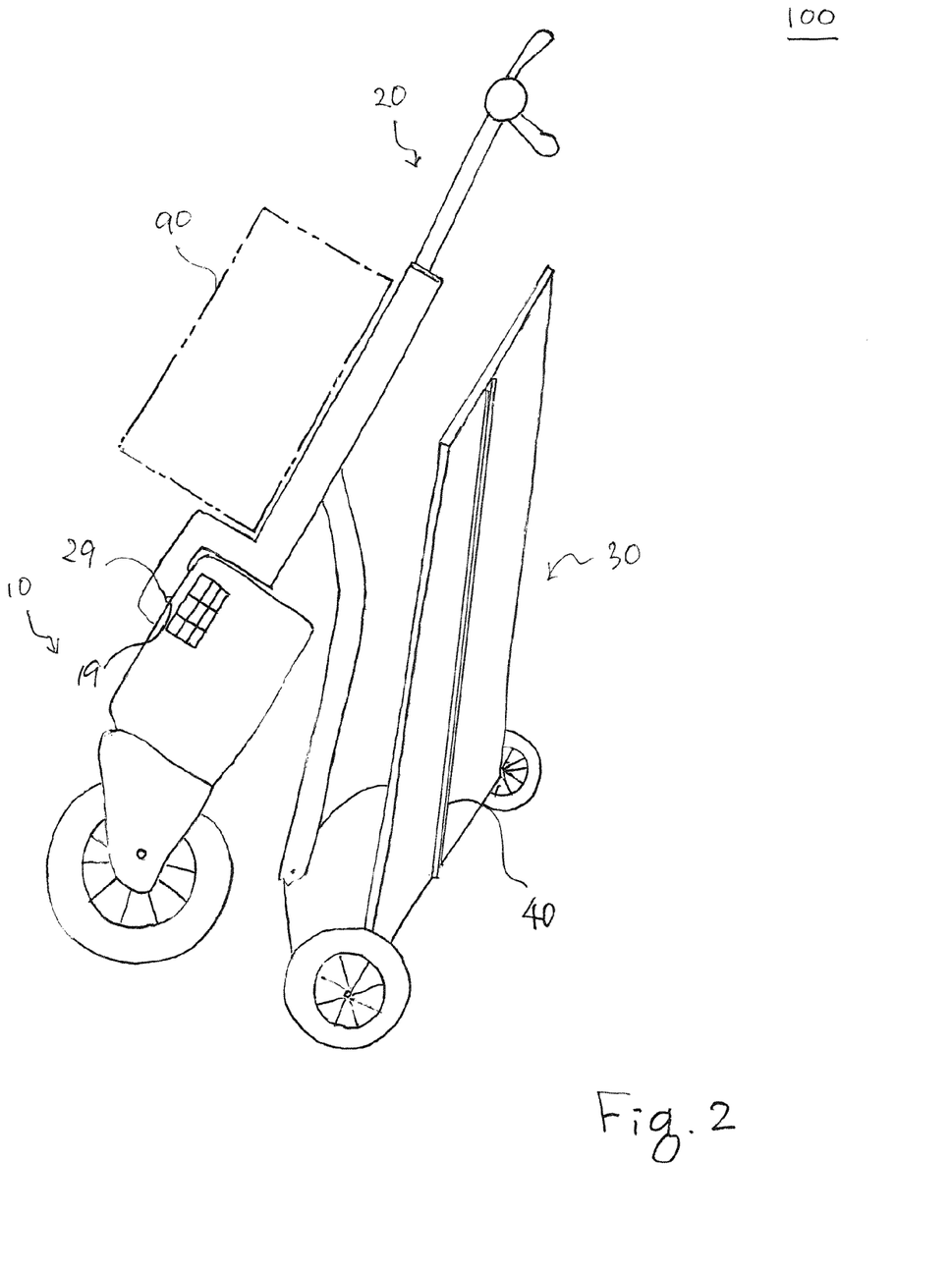
FIG. 2 is a perspective view showing the transformable folding electric scooter of FIG. 1 folded according to another embodiment of the invention.
Figure 3:
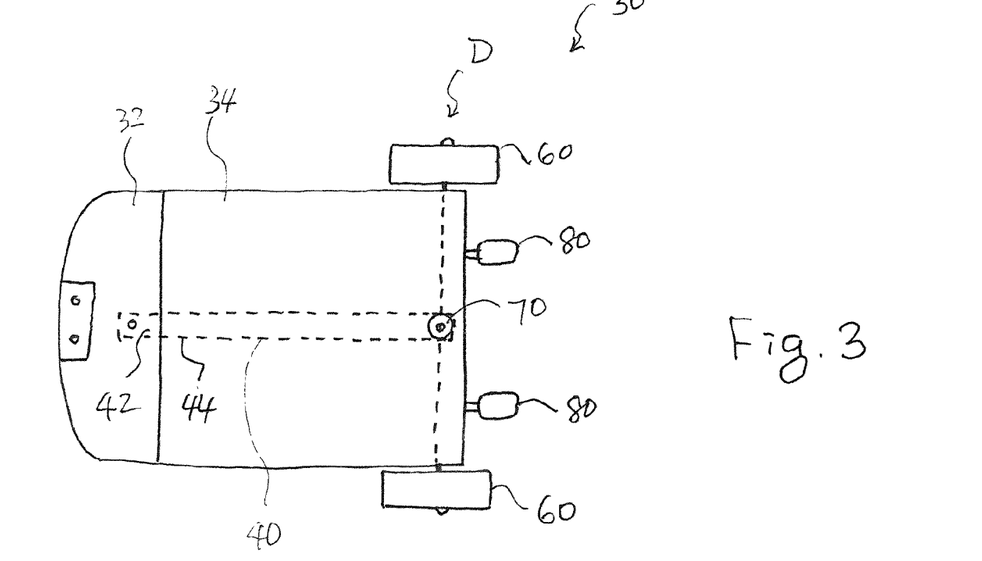
FIG. 3 is a top plan view showing a boarding plate with rear wheels deployed at a rear position according to an embodiment of the invention.
Figure 4:
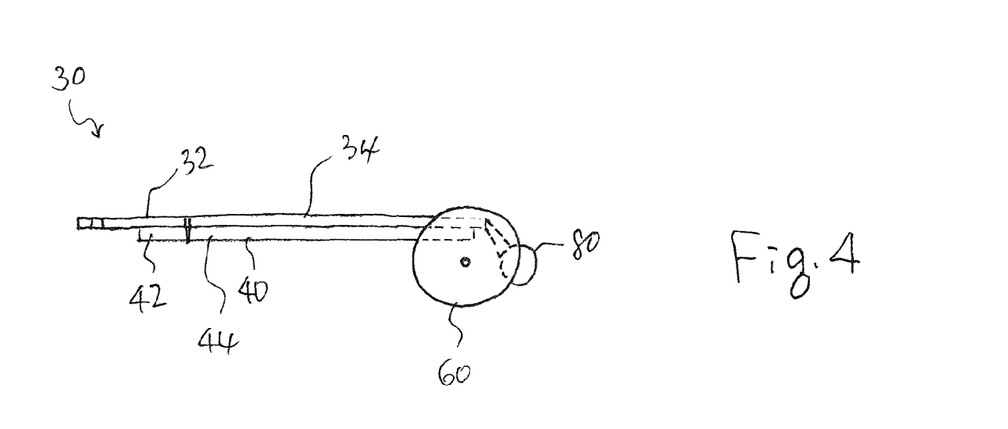
FIG. 4 is a side view showing the boarding plate of FIG. 3.
Figure 5:
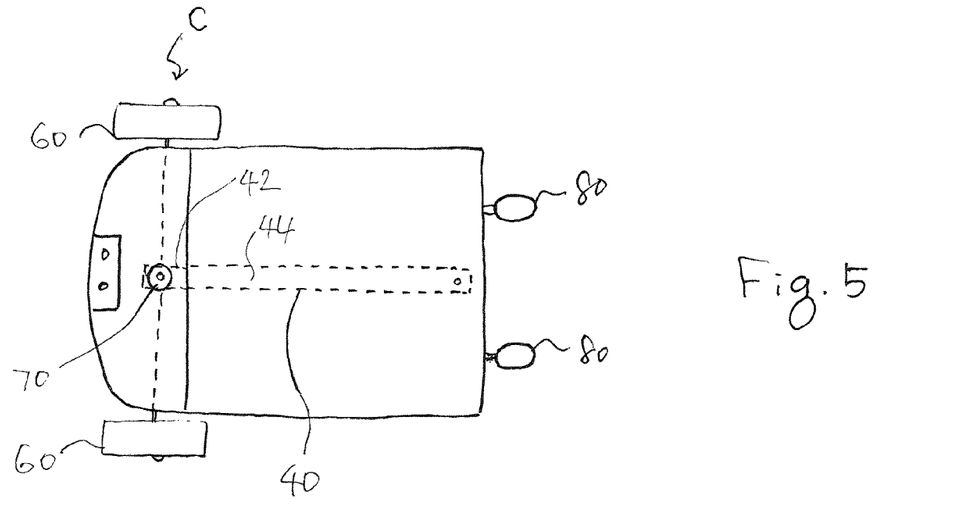
FIG. 5 is a top plan view showing the boarding plate with rear wheels deployed at a front position according to an embodiment of the invention.

FIGS. 1 and 2 show a transformable folding electric scooter according to embodiments of the invention, and FIGS. 3-8 show boarding plate according to embodiments of the invention.

An aspect of the invention provide a transformable folding electric scooter 100, which comprises a motor engine 10, a connecting frame 20, and a boarding plate 30.

The motor engine 10 comprises a power wheel 12 provided in an engine body 11, an electric motor 14 installed in a hub portion 13 of the power wheel 12 and configured for rotating the power wheel 12, a rechargeable battery 16 provided in the engine body 11, and a power control board 18 provided on an external surface of the engine body 11. Of course, the electric motor 14 may be installed inside the engine body 11. In such a case, a power-delivering mechanism may be added between the electric motor 14 and the axle of the power wheel 12.

The connecting frame 20 comprises a handle frame 22 disposed upright and having a handle 23 at a top portion thereof, a front frame 24 extending forward from a lower portion of the handle frame 22 and connected to the motor engine 10 foldably at a first folding position A provided on the motor engine 10, and a rear frame 26 extending rearward from the lower portion of the handle frame 22.

The boarding plate 30 comprises a front plate portion 32 connected to a lower portion of the rear frame fixedly, and a rear plate portion 34 connected to the front plate portion 32 foldably at a second folding position B provided between the front plate portion 32 and the rear plate portion 34 of the boarding plate 30.

The transformable folding electric scooter 100 further comprises a guide rail 40 attached fixedly on a bottom surface extending along a central portion of the boarding plate 30. The guide rail 40 comprises a front rail portion 42 fixedly attached on the bottom surface of the front plate portion 32 and a rear rail portion 44 fixedly attached on the bottom surface of the rear plate portion 34. The front rail portion 42 and the rear rail portion 44 are configured to be divided when the front and rear plate portions 32, 34 are folded.

In certain embodiments of the invention, the guide rail 40 may further comprise a slot portion penetrated through the top of the boarding plate 30, so that the fastener handle 70 may be dragged all along the slot while loosened a little from the wheel-hub portion 50 as shown in FIG. 1.

The transformable folding electric scooter 100 further comprises a wheel-hub portion 50 provided in the guide rail 40 so as to be moved along the guide rail 40 and fixed at a first fixing position C under the front plate portion 32 and a second fixing position D under the rear plate portion 34.

The transformable folding electric scooter 100 further comprises a pair of rear wheels 60 extending from the wheel-hub portion 50.

The motor engine 10 is folded upward at the first folding position A.

The rear plate portion 34 is folded upward with respect to the front plate portion 32 at the second folding position B as shown in FIG. 2.

Figure 9:
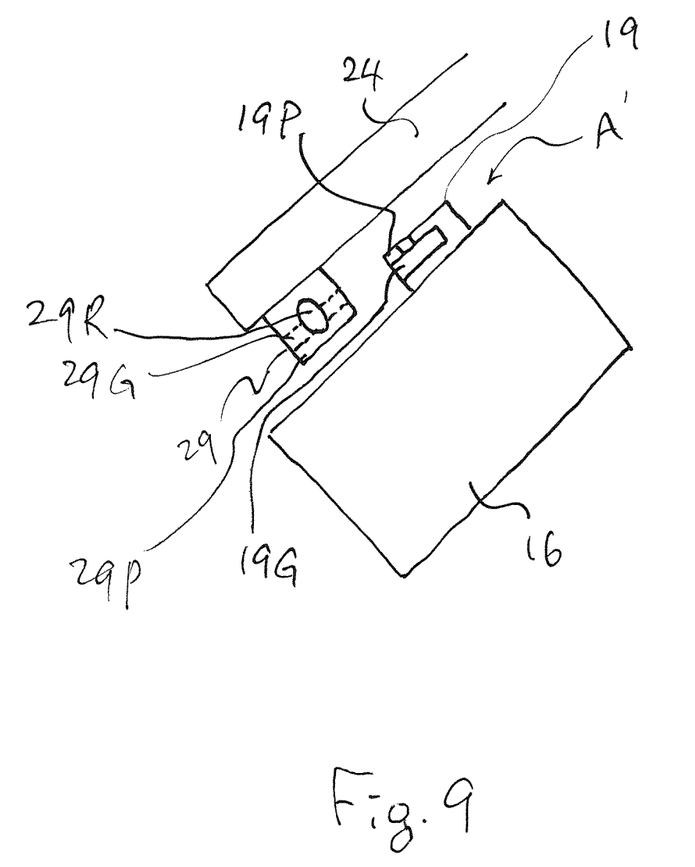
FIG. 9 is a perspective view showing a first detachable fastener and a second detachable fastener according to an embodiment of the invention.

The motor engine 10 may comprise a first detachable fastener 19 and the front frame 24 comprises a second detachable fastener 29, so that the first detachable fastener 19 and the second detachable fastener 29 engage each other detachably as shown in FIG. 2 and FIG. 9.

In a certain embodiment as shown in FIG. 9, the first detachable fastener 19 may have a protrusion 19P and a groove 19G, and the second detachable fastener 29 may have a protrusion 29P, a groove 29G, and a release button 29R, so that the first detachable fastener 19 and the second detachable fastener 29 can be assembled or disassembled momentarily, within less than a second.

The handle frame 22 may comprise a plurality of controllers 22C connected electrically to the power control board 18.

The handle frame 22 may comprise a foldable joint 22J for folding the handle frame 22 rearwards by at least 90 degrees. Of course, in certain embodiments, a part of the top portion of the hand frame 22 can be made retractable into the bottom portion thereof.

The handle frame 22 may be configured to tilt sideways by about 15 degrees about a lower end portion thereof by installing a tilting axle device, which is well known to the community.

The motor engine 10 may be detachable from the front frame 24 at the first folding position for storage or carrying around.

Figure 6:
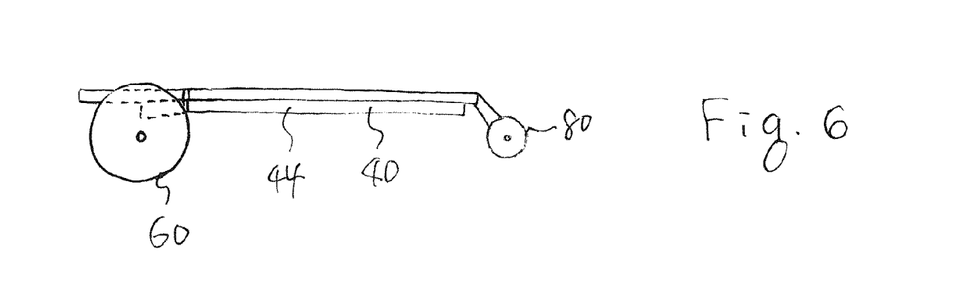
FIG. 6 is a side view showing the boarding plate of FIG. 5.
Figure 7:
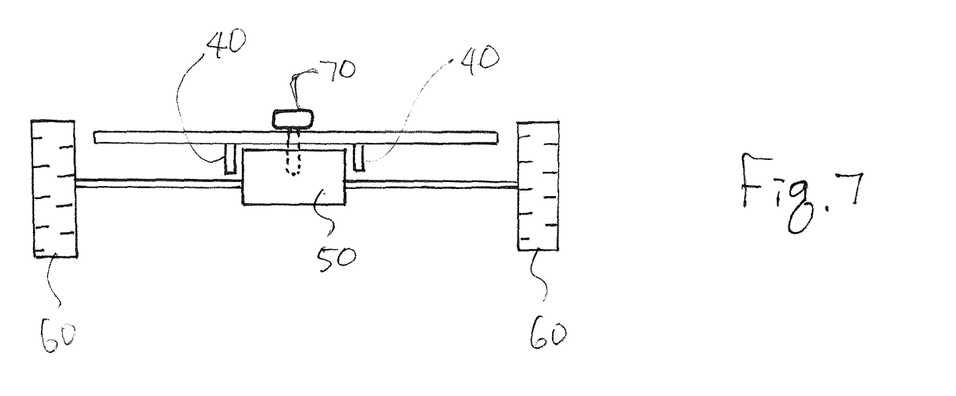
FIG. 7 is a front view showing a boarding plate and rear wheels according to an embodiment of the invention.
Figure 8:
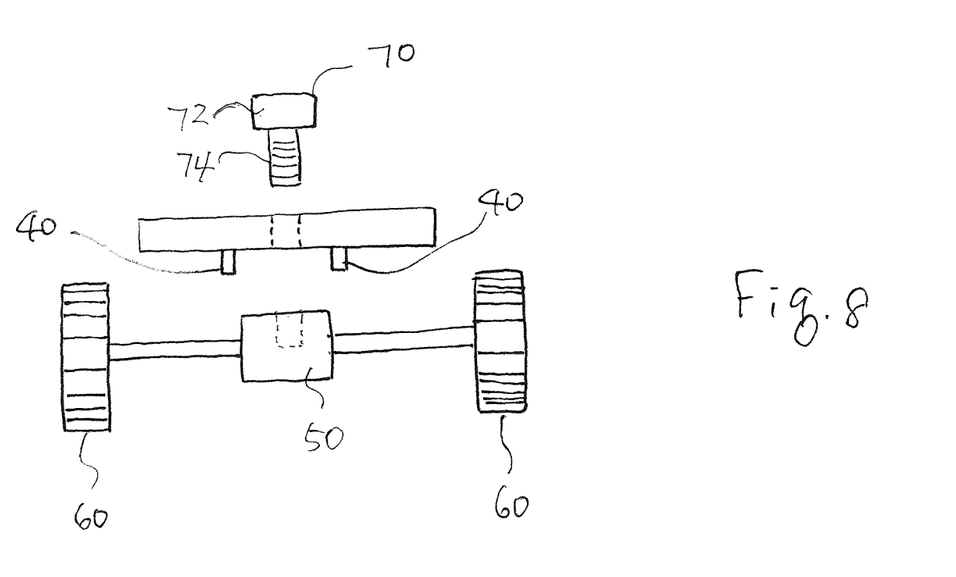
FIG. 8 is an exploded front view of FIG. 7.

The front plate portion 32 and the rear plate portion 34 may be configured to fold downward only at the second folding position B. Before folding, of course, the rear wheels 60 may be pushed forward as shown in FIG. 6.

The transformable folding electric scooter 100 may further comprise a fastener handle 70 for engaging one of two through-holes bored through the front plate portion and the rear plate portion and a fastening hole provided on the wheel-hub portion 50 and fixing the assembly of the wheel-hub portion 50 and the two rear wheels 60 to the boarding plate 30.

The fastener handle 70 may comprise a handle portion 72 and a fastening portion 74.

The fastening portion 74 may comprise male threads, and each of the two through-holes and the fastening hole comprises female threads.

The transformable folding electric scooter 100 may further comprise one or two auxiliary wheels 80 provided on a rear end portion of the rear plate portion 34 and disposed tiltedly rearwards above a floor defined by the two rear wheels 60 by a specific distance as shown in FIGS. 3-6. The two auxiliary wheels 80 help a rider not to fall down backwards.

The front plate portion 32 may have a length so as to minimize a folding length in a to-and-fro direction.

The transformable folding electric scooter 100 is foldable, saving lots of space storage and delivery.

The transformable folding electric scooter 100 can be assembled or disassembled easily. The rear frame 26 and the front plate portion 32 can be connected detachably in certain embodiments, in which they can be connected to each other by one or two bolts and nuts for example.

As shown in FIG. 2, the folded transformable folding electric scooter 100 can be dragged easily with the rear wheels 60 touching the floor, just like a traveling bag with wheels.

Also, as shown in FIG. 2, the transformable folding electric scooter 100 can be transformed to a shopping cart by attaching a basket 90.

Figure 10:
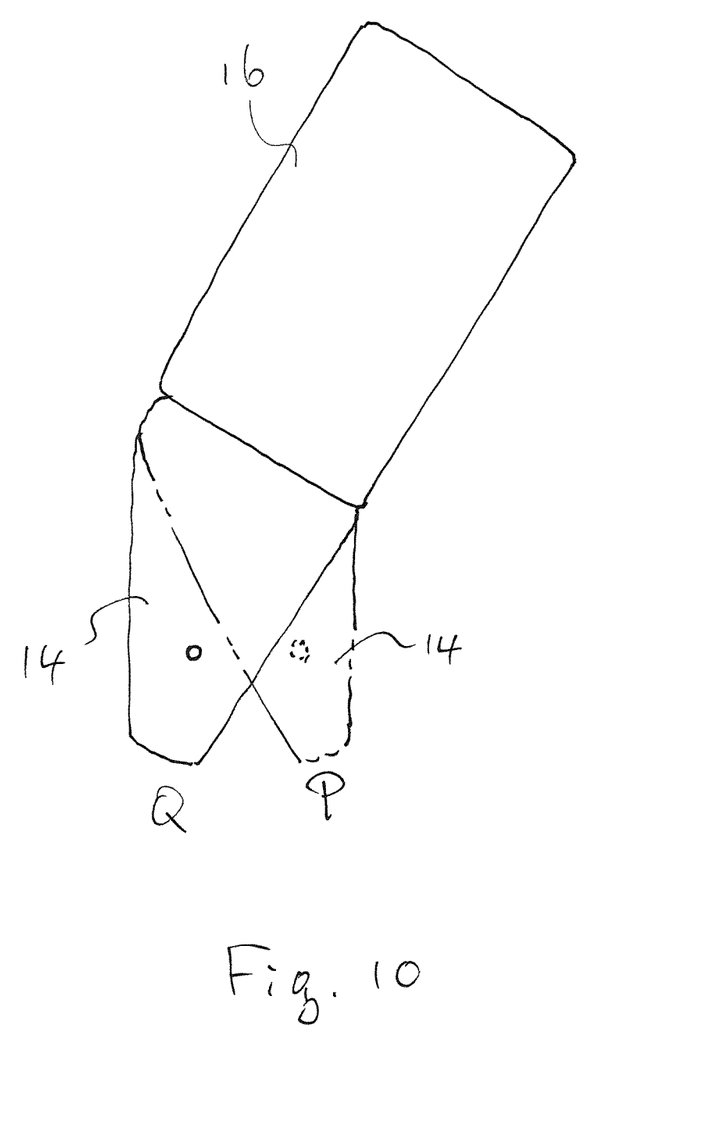
FIG. 10 is a perspective view showing two positions of a power wheel and a hub portion according to an embodiment of the invention.

The power wheel 12 and the hub portion 13 may be configured to be deployed to one of two positions including a retracted position P and a deployed position Q as shown in FIG. 10. The retracted position is obtained by a spring (not shown) installed between the hub portion 13 and the rechargeable battery portion 16 without an external force, and the deployed position is obtained by stretching the spring and locking with a locker (not shown). The spring and the locker are well-known to the community. The power wheel is securely deployed for operation at the deployed position, and is partially folded for easy storage or handling at the retracted position.

Figure 11:
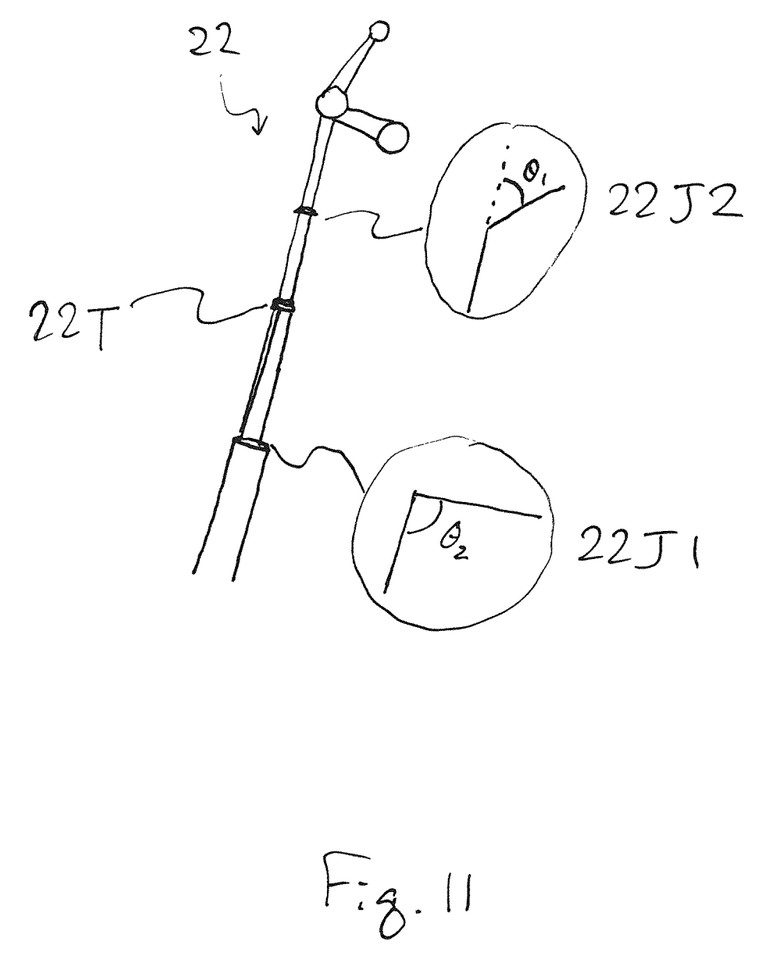
FIG. 11 is a perspective view showing a handle frame with joints provided according to an embodiment of the invention.

The handle frame 22 may comprise a first foldable joint 22J1 and a second foldable joint 22J2 as shown in FIG. 11.

The first foldable joint 22J1 is disposed in a middle portion thereof for folding the middle portion of the handle frame 22 by at least 90 degrees, $\theta_2$.

The second foldable joint 22J2 is disposed above the first foldable joint for folding an upper portion of the handle frame by at least 60 degrees, $\theta_1$.

The handle frame 22 may further comprise a telescoping retractable joint 22T between the first and second foldable joints 22J1, 22J2. By folding one or both of the first and second foldable joints 22J1, 22J2, the handle frame 22 may be made to a desirable length and shape for the purposes.

Figure 12:
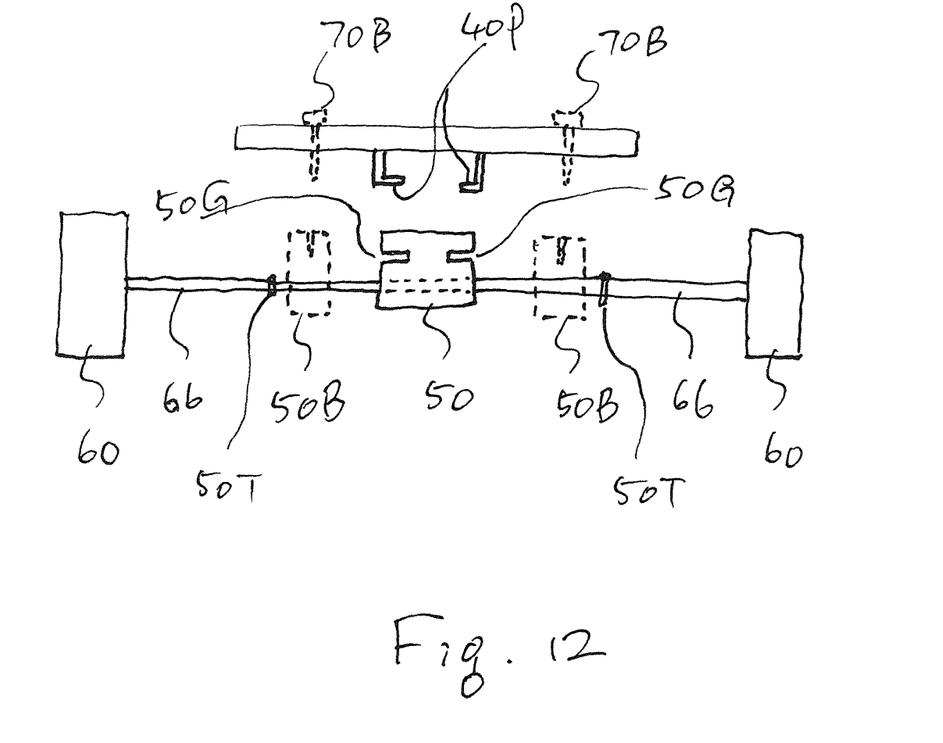
FIG. 12 is an exploded front view of a boarding plate and rear wheels according to another embodiment of the invention.

The transformable folding electric scooter 100 may further comprise an L-shaped guiding protrusion 40P provided on each end of the guide rail 40, and a guiding groove 50G for receiving a corresponding L-shaped guiding protrusion 40P as shown in FIG. 12.

The transformable folding electric scooter 100 may further comprise two auxiliary axle supports 50B provided on a rear portion of a lower surface of the boarding plate 30. Each of the two auxiliary axle supports 50B engages the rear-wheel axle 66 through a hole provided through the auxiliary axle supports 50B, and each of the two auxiliary axle supports 50B is configured to be fixed to the boarding plate 30 with a mechanical fastener 70B. Each of the two auxiliary axle supports 50B engages the rear-wheel axle 66 rotatably through bearings. The same holds true for between the wheel-hub portion 50 and the rear-wheel axle 66.

The rear-wheel axle 66 may be provided with two retractable joints 50T, which makes the storage space still smaller.

Figure 13:
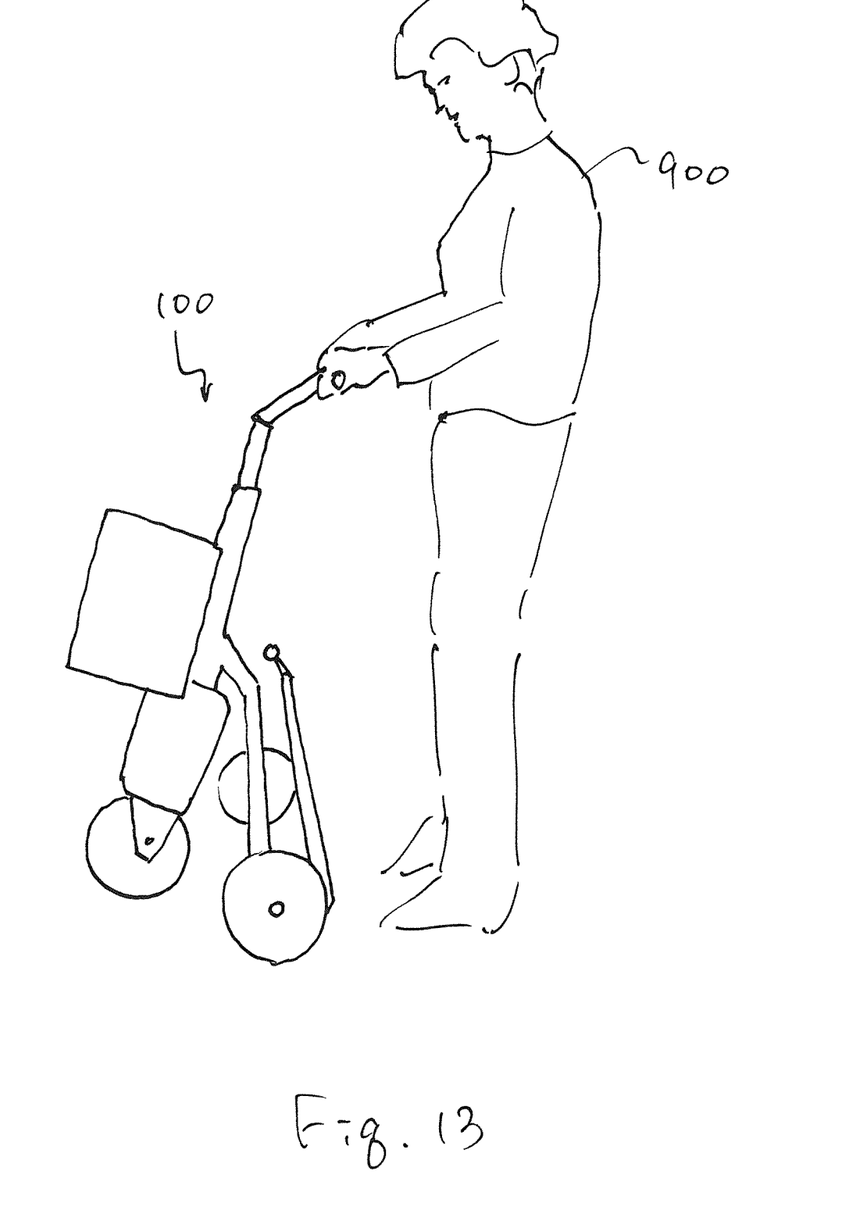
FIG. 13 is a perspective view of a user using a folded transformable folding electric scooter like a shopping cart.
Figure 14:
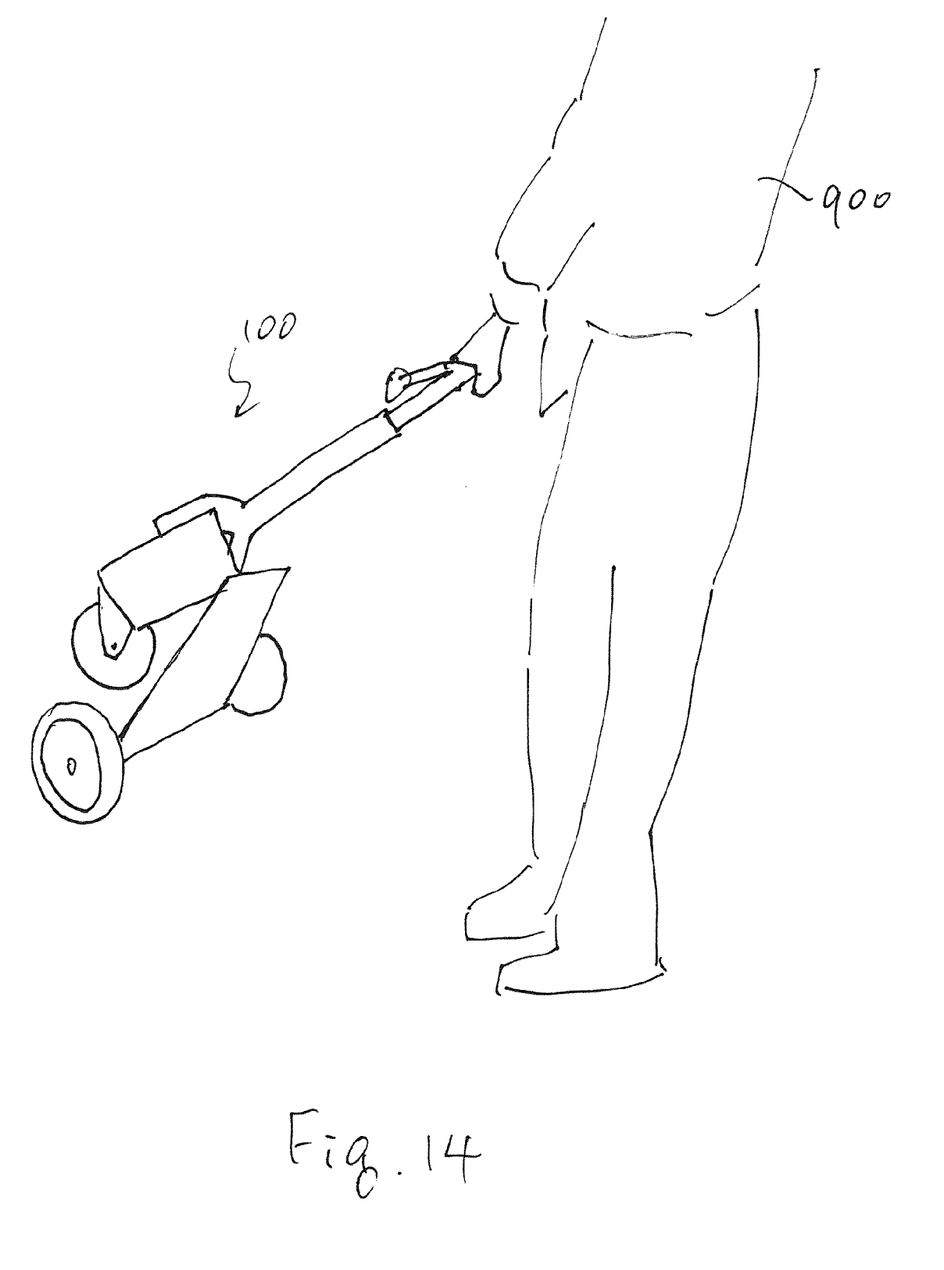
FIG. 14 is a perspective view of a user dragging a folded transformable folding electric scooter.

FIG. 13 and FIG. 14 show how a user 900 pushes or pulls a folded transformable folding electric scooter 100.

The transformable folding electric scooter 100 may further comprise a front brake (not shown) provided in the hub portion. The front brake may include a disc-brake.

The transformable folding electric scooter 100 may further comprise two rear brakes (not shown) provided in the rear wheels.

In certain embodiments of the invention, the transformable folding electric scooter 100 may comprise both of the front and rear brakes.

In general, a folding scooter having three wheels is a preferable embodiment of the invention.

A motorized front wheel is provided for direct drive.

Easy assembly is provided at two points between the battery and the front wheel support and between the front frame and the rear frame.

Scooters with folding handle bars may exist. However, there is no folding scooter folded at the platform (foot stand).

Optionally, the handle bars may be folded, making the scooter compact.

A brake is provided in the front wheel.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A transformable folding electric scooter comprising:
    a motor engine comprising:
        a power wheel provided in an engine body;
        an electric motor installed in a hub portion of the power wheel and configured for rotating the power wheel;
        a rechargeable battery provided in the engine body; and
        a power control board provided on an external surface of the engine body;

a connecting frame comprising:
- a handle frame disposed upright and having a handle at a top portion thereof;
- a front frame extending forward from a lower portion of the handle frame and connected to the motor engine foldably at a first folding position provided on the motor engine; and
- a rear frame extending rearward from the lower portion of the handle frame;

a boarding plate comprising:
- a front plate portion connected to a lower portion of the rear frame fixedly; and
- a rear plate portion connected to the front plate portion foldably at a second folding position provided between the front plate portion and the rear plate portion of the boarding plate;

a guide rail attached fixedly on a bottom surface extending along a central portion of the boarding plate, wherein the guide rail comprises a front rail portion fixedly attached on the bottom surface of the front plate portion and a rear rail portion fixedly attached on the bottom surface of the rear plate portion, and wherein the front rail portion and the rear rail portion are configured to be divided when the front and rear plate portions are folded;

a wheel-hub portion provided in the guide rail so as to be moved along the guide rail and fixed at a first fixing position under the front plate portion and a second fixing position under the rear plate portion; and a pair of rear wheels connected with a rear-wheel axle being queued through and engaging the wheel-hub portion, wherein the motor engine is folded upward at the first folding position, and wherein the rear plate portion is folded upward with respect to the front plate portion at the second folding position.

2. The transformable folding electric scooter of claim 1, wherein the motor engine comprises a first detachable fastener and the front frame comprises a second detachable fastener, so that the first detachable fastener and the second detachable fastener engage each other detachably.

3. The transformable folding electric scooter of claim 1, wherein the handle frame comprises a plurality of controllers connected to the power control board.

4. The transformable folding electric scooter of claim 1, wherein the handle frame comprises a foldable joint for folding the handle frame by at least 90 degrees.

5. The transformable folding electric scooter of claim 1, wherein the handle frame is configured to tilt sideways by about 15 degrees about a lower end portion thereof.

6. The transformable folding electric scooter of claim 1, wherein the motor engine is detachable from the front frame at the first folding position.

7. The transformable folding electric scooter of claim 1, wherein the front plate portion and the rear plate portion are configured to fold downward only at the second folding position.

8. The transformable folding electric scooter of claim 1, further comprising a fastener handle for engaging one of two through-holes bored through the front plate portion and the rear plate portion and a fastening hole provided on the wheel-hub portion and fixing the assembly of the wheel-hub portion and the two rear wheels to the boarding plate.

9. The transformable folding electric scooter of claim 8, wherein the fastener handle comprises a handle portion and a fastening portion.

10. The transformable folding electric scooter of claim 9, wherein the fastening portion comprises male threads, and each of the two through-holes and the fastening hole comprises female threads.

11. The transformable folding electric scooter of claim 9, further comprising one or two auxiliary wheels provided on a rear end portion of the rear plate portion and disposed tiltedly rearwards above a floor defined by the two rear wheels by a specific distance.

12. The transformable folding electric scooter of claim 1, wherein the front plate portion has a length so as to minimize a folding length in a to-and-fro direction.

13. The transformable folding electric scooter of claim 1, wherein the power wheel and the hub portion are configured to be deployed to one of two positions including a retracted position and a deployed position.

14. The transformable folding electric scooter of claim 1, wherein the handle frame comprises:
- a first foldable joint disposed in a middle portion thereof for folding the middle portion of the handle frame by at least 90 degrees; and
- a second foldable joint disposed above the first foldable joint for folding an upper portion of the handle frame by at least 60 degrees.

15. The transformable folding electric scooter of claim 14, wherein the handle frame further comprises a telescoping retractable joint between the first and second foldable joints.

16. The transformable folding electric scooter of claim 1, further comprising:
- an L-shaped guiding protrusion provided on each end of the guide rail; and
- a guiding groove for receiving a corresponding L-shaped guiding protrusion.

17. The transformable folding electric scooter of claim 1, further comprising two auxiliary axle supports provided on a rear portion of a lower surface of the boarding plate, wherein each of the two auxiliary axle supports engages the rear-wheel axle through a hole provided through the auxiliary axle supports, and wherein each of the two auxiliary axle supports is configured to be fixed to the boarding plate with a mechanical fastener.

* * * * *